United States Patent
Brinkert et al.

(10) Patent No.: US 9,399,923 B2
(45) Date of Patent: Jul. 26, 2016

(54) TURBINE FOR AN EXHAUST GAS TURBOCHARGER

(71) Applicant: DAIMLER AG, Stuttgart (DE)

(72) Inventors: Nils Brinkert, Stuttgart (DE); Siegfried Sumser, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 439 days.

(21) Appl. No.: 13/959,481

(22) Filed: Aug. 5, 2013

(65) Prior Publication Data

US 2014/0003910 A1   Jan. 2, 2014

Related U.S. Application Data

(63) Continuation-in-part of application No. PCT/EP2011/006098, filed on Dec. 6, 2011.

(30) Foreign Application Priority Data

Feb. 5, 2011 (DE) .......................... 10 2011 010 454

(51) Int. Cl.
| | |
|---|---|
| F04D 29/44 | (2006.01) |
| F01D 9/02 | (2006.01) |
| F02B 37/02 | (2006.01) |
| F01D 17/14 | (2006.01) |

(Continued)

(52) U.S. Cl.
CPC ................ *F01D 9/026* (2013.01); *F01D 17/14* (2013.01); *F02B 37/025* (2013.01); *F01D 17/18* (2013.01); *F02C 6/12* (2013.01); *F05D 2220/40* (2013.01); *F05D 2270/08* (2013.01); *Y02T 10/144* (2013.01)

(58) Field of Classification Search
CPC ......... F01D 9/026; F01D 25/24; F01D 17/14; F05D 2220/40; F02B 37/00; F02B 37/02; F02C 6/12
USPC ................................... 415/204, 205; 60/605.1
See application file for complete search history.

(56) References Cited

U.S. PATENT DOCUMENTS

| | | | | | |
|---|---|---|---|---|---|
| 3,552,876 | A | * | 1/1971 | Updike | ................... F01D 9/026 415/205 |
| 3,664,761 | A | * | 5/1972 | Zastrow | ................... F01D 9/026 415/205 |

(Continued)

FOREIGN PATENT DOCUMENTS

| | | | |
|---|---|---|---|
| DE | 4242494 C1 * | 9/1993 | ............ F01D 17/141 |
| DE | 10 2008 020 406 | 10/2009 | |

(Continued)

*Primary Examiner* — Patrick Maines
(74) *Attorney, Agent, or Firm* — Klaus J. Bach

(57) ABSTRACT

In a turbine for an exhaust gas turbocharger having a turbine housing which has a first and a second spiral channel with the second spiral channel extending over a wrap angle range of less than 360 degrees of a turbine wheel of the turbine, and the first spiral channel having a larger wrap angle range than the second spiral channel and the spiral channels being arranged adjacent each other in at least one angular range which includes the wrap angle ranges, the nozzle has an overall nozzle width via which exhaust gas is admitted to the turbine wheel over a respective partial nozzle width of the spiral channels wherein the partial nozzle width of the first spiral channel is greater than the partial nozzle width of the first spiral channel in the first angular range, at least in a further angular range of the wrap angle range which is different from the at least one angular range.

9 Claims, 5 Drawing Sheets

(51) Int. Cl.
*F01D 17/18* (2006.01)
*F02C 6/12* (2006.01)

(56) References Cited

U.S. PATENT DOCUMENTS

| | | | |
|---|---|---|---|
| 2011/0067397 A1* | 3/2011 | Hirth | F02B 37/025 60/602 |
| 2011/0079009 A1* | 4/2011 | Kratschrner | F01D 9/026 60/605.1 |
| 2011/0088391 A1* | 4/2011 | Sumser | F01D 17/141 60/602 |

FOREIGN PATENT DOCUMENTS

| | | | | |
|---|---|---|---|---|
| DE | 10 2008 039 085 | | 2/2010 | |
| DE | 10 2008 039 086 | | 2/2010 | |
| DE | 102013006370 A1 | * | 10/2014 | ............ F01D 17/141 |
| GB | WO 2014140598 A1 | * | 9/2014 | ............. F01D 9/026 |
| JP | 63-088221 | | 4/1988 | |

* cited by examiner

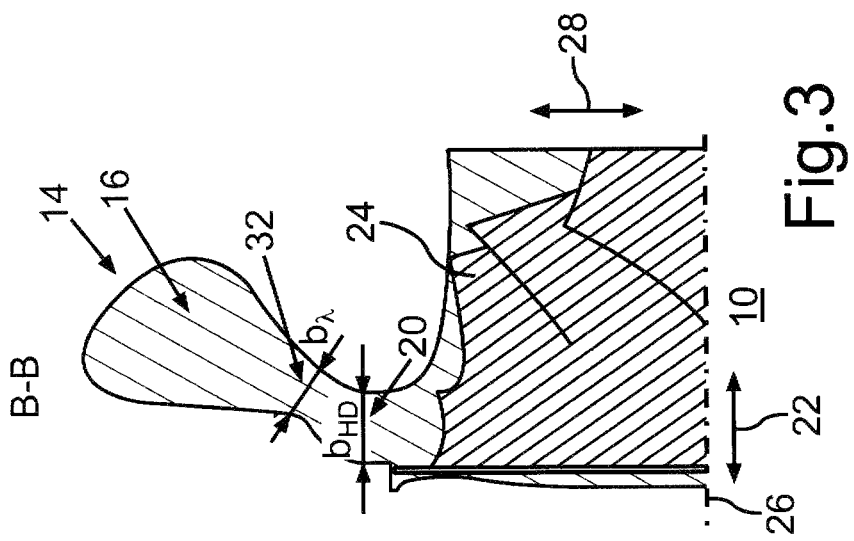
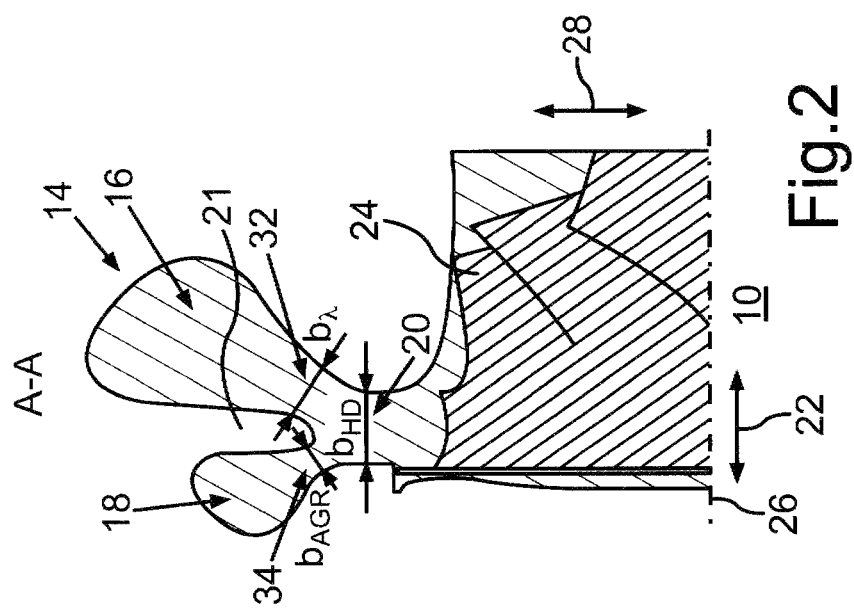

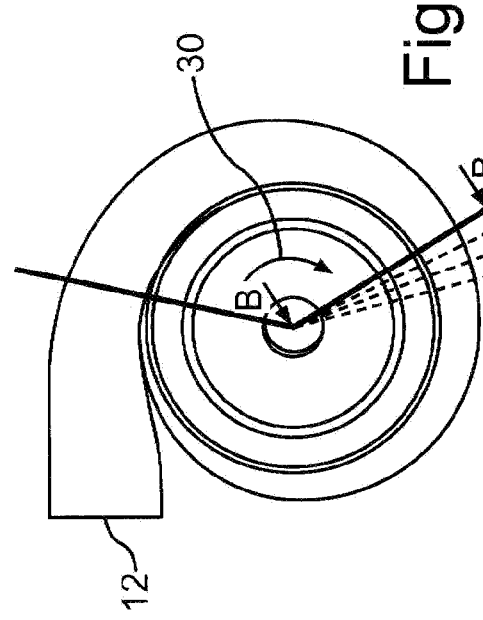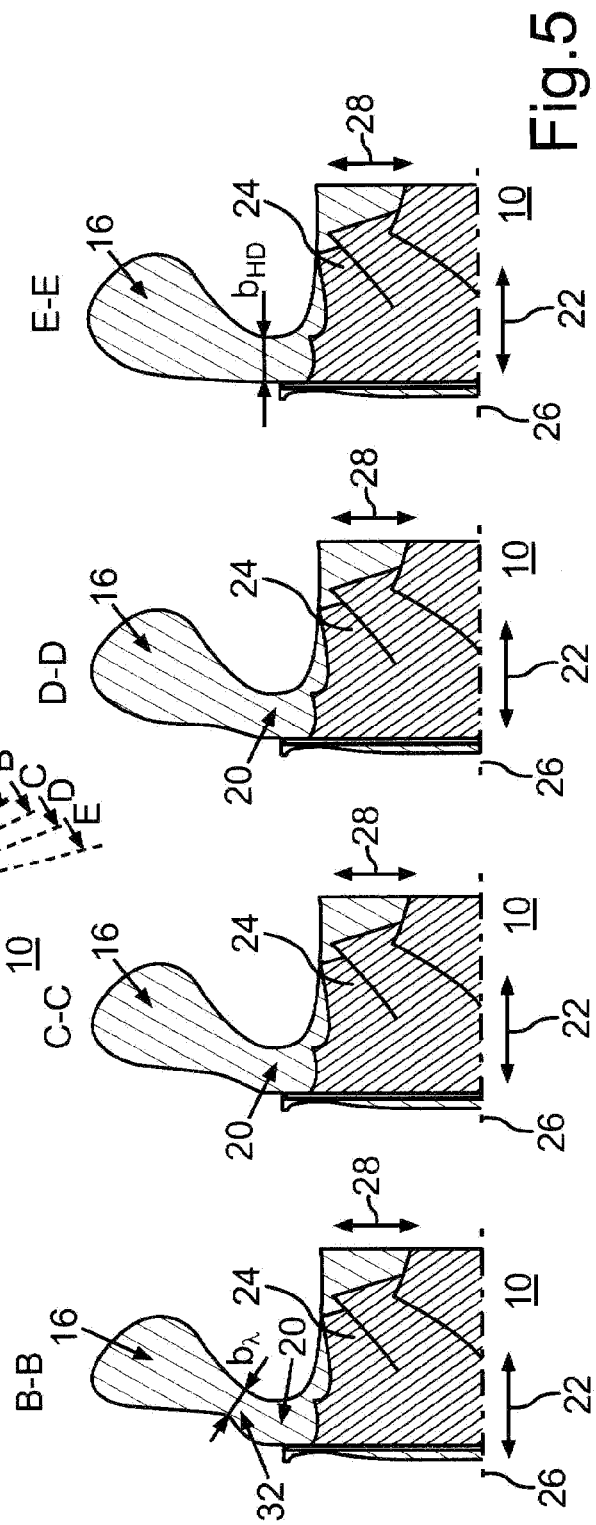

TURBINE FOR AN EXHAUST GAS TURBOCHARGER

This is a Continuation-In-Part application of pending international patent application PCT/EP2011/006098 filed Dec. 6, 2011 and claiming the priority of German patent application 10 2011 010 4542 filed Feb. 8, 2011.

BACKGROUND OF THE INVENTION

The invention relates to a turbine for an exhaust gas turbocharger, the turbine having first and second spiral inlet channels extending over different turbine wheel wrap angles.

In the serial production of motor vehicles, exhaust gas turbochargers are used which have a particular turbine in which the turbine is acted on by exhaust gas via two ducts, for example. If the internal combustion engine has, for example, a plurality of combustion chambers or cylinders, some of the combustion chambers may supply their exhaust gas to one of the ducts, and the others of the combustion chambers may supply their exhaust gas to the other duct.

One of the ducts may be segmented. This means that a turbine housing of the turbine has a first spiral channel and a second spiral channel which are associated with the duct structure. A reduction in throughput of the one duct compared to the other duct is provided in such a way, for example, that one of the spiral channels has a smaller wrap angle than the other of the spiral channels.

However, it has been shown that this results in a significant drop in efficiency in particular due to ventilation losses, which in turn impairs the overall efficiency of the turbine.

It is the principal object of the present invention, therefore, is to provide a turbine for an exhaust gas turbocharger which has improved efficiency.

SUMMARY OF THE INVENTION

In a turbine for an exhaust gas turbocharger having a turbine housing which has a first and a second spiral channel with the second spiral channel extending over a wrap angle range of less than 360 degrees of a turbine wheel of the turbine, and the first spiral channel having a larger wrap angle range than the second spiral channel and the spiral channels being arranged adjacent each other in at least one angular range which includes the wrap angle ranges, the nozzle has an overall nozzle width via which exhaust gas is admitted to the turbine wheel over a respective partial nozzle width of the spiral channels wherein the partial nozzle width of the first spiral channel is greater than the partial nozzle width of the first spiral channel in the first angular range, at least in a further angular range of the wrap angle range which is different from the at least one angular range.

Exhaust gas which flows through the spiral channels may be directed onto the turbine wheel, which is accommodated in the turbine, via a nozzle which is delimited in the axial direction of the turbine wheel by walls of the turbine housing and which extends in the peripheral direction of the turbine wheel and has an overall nozzle width.

Exhaust gas is supplied to the nozzle, at least in the angular range, over a respective partial nozzle width of the spiral channels. In other words, in the angular range, exhaust gas may flow from the second spiral channel into the nozzle over the partial nozzle width of the second spiral channel. Likewise, in the angular range, exhaust gas may flow from the first spiral channel into the nozzle over the first partial nozzle width. From this nozzle, the exhaust gas may then flow over the overall nozzle width and be directed onto the turbine wheel, so that the turbine wheel is acted on by the exhaust gas and driven by same.

According to the invention, it is provided that the partial nozzle width of the first spiral channel, which has the larger of the wrap angle ranges, is greater, at least in a further angular range of the first guide area which differs from the angular range, than the partial nozzle width of the first spiral channel in the first angular range.

Since the wrap angle range of the first spiral channel is larger than the wrap angle range of the second spiral channel, the at least one further angular range is provided in the peripheral direction of the turbine wheel in which only the first spiral channel, but not the second spiral channel, extends in the peripheral direction of the turbine wheel. In other words, the spiral channels are not situated adjacent to one another in the at least one further angular range in the axial direction of the turbine wheel, since the second spiral channel, in contrast to the first spiral channel, does not extend in the at least one further angular range.

Due to the fact that the first spiral channel which extends in the at least one further angular range has a wider partial nozzle width than in the first angular range, the drop in efficiency, described at the outset, due to ventilation losses is reduced or entirely avoided, which is accompanied by improved efficiency of the turbine according to the invention. The turbine according to the invention may thus be operated in a particularly efficient manner.

If an internal combustion engine which is for example a reciprocating piston machine, in particular a gasoline engine, diesel engine, or diesel-gasoline engine, is associated with the turbine, this more efficient and improved operation of the turbine according to the invention allows particularly efficient operation of the internal combustion engine with low energy consumption, so that the internal combustion engine has only very low fuel consumption and low $CO_2$ emissions. The turbine according to the invention is usable for internal combustion engines for passenger vehicles as well as for utility vehicles or other types of vehicles or other types of drive units. The turbine according to the invention may also be provided for a fuel cell, for example, and exhaust gas may flow through and drive the fuel cell.

In addition, the turbine according to the invention allows provision of an advantageous accumulation characteristic for providing particularly high exhaust gas recirculation rates, since the spiral channels allow segmentation of a duct. If the internal combustion engine has, for example, two combustion chambers, in particular cylinders, in which combustion processes take place and result in exhaust gas, one of the combustion chambers conveys its exhaust gas to one duct, and the other combustion chamber conveys its exhaust gas to another duct. For example, the spiral channels of the turbine housing of the turbine according to the invention are associated with one of these ducts, while only one spiral channel is associated with the other duct, this spiral channel having a flow cross section, for example, that is at least essentially equal to a sum of a flow cross section of the first spiral channel and a flow cross section of the second spiral channel.

The duct with which the two spiral channels are associated is thus segmented by the spiral channels, and has a greater accumulation characteristic than the other duct. This increased accumulation characteristic is provided in particular by the wrap angle range of the second spiral channel, which is less than the wrap angle range of the first spiral channel, so that by means of the turbine according to the invention, particularly large quantities of exhaust gas may be recirculated from an exhaust gas side of the internal combustion engine to an intake tract and introduced into the intake tract. Air drawn in by the internal combustion engine may thus be acted on by exhaust gas, which keeps the nitrogen oxides and particulate emissions of the internal combustion engine low.

To provide the fluid separation of the spiral channels of the turbine housing of the turbine according to the invention from one another, at least in parts, for example an intermediate wall of the turbine housing is provided which extends in the axial direction of the turbine wheel between the spiral channels and in the peripheral direction of the turbine wheel.

The partial nozzle width of the first spiral channel extends, for example, at least essentially in the axial direction of the turbine wheel, and is delimited on the one hand by the intermediate wall which also delimits the second spiral channel, and [on the other hand] by a first wall of the turbine housing which delimits the first spiral channel. Similarly, the partial nozzle width of the second spiral channel is delimited on the one hand by the intermediate wall which also delimits the first spiral channel, and on the other hand by a second wall of the turbine housing which delimits the second spiral channel.

The wrap angle range of the first spiral channel is, for example, at least essentially greater than 350°, in particular at least essentially 360°, so that the first spiral channel is designed as a full spiral. The wrap angle range of the second spiral channel is much smaller in comparison, and is at least essentially 140°, for example.

The first spiral channel may function as a so-called λ duct which is used for setting a desired air-to-fuel ratio and thus for providing desired power and desired torque of the internal combustion engine. The second spiral channel may be designed as a so-called exhaust gas recirculation (EGR) duct which is used for providing the described advantageous accumulation characteristic to allow recirculation of particularly large linear extents of exhaust gas.

In one particularly advantageous embodiment of the invention, the partial nozzle width of the first spiral channel in the further angular range is at least essentially as great as the overall nozzle width, so that the partial nozzle width of the first spiral channel in the further angular range at least essentially corresponds to the overall nozzle width. In other words, the overall nozzle width is formed by the partial nozzle width of the first spiral channel. This means that in the further angular range, the exhaust gas, which in the further angular range flows solely from the first spiral channel and against the turbine wheel (since the first spiral channel no longer extends in this further angular range), flows against the turbine wheel over the overall nozzle width over which the exhaust gas also flows against the turbine wheel in the first angular range, in which the nozzle is supplied with exhaust gas by both spiral channels.

The particularly small wrap angle range of the second spiral channel, which is smaller than the wrap angle range of the first spiral channel, is thus combined with an overall turbine nozzle at a wheel inlet of the turbine wheel, so that covering of the wheel inlet in the further angular range is at least essentially not provided. This keeps the ventilation losses of the turbine according to the invention particularly low. At the same time, the turbine is manufacturable in a particularly simple and therefore time- and cost-efficient manner, in particular with regard to the partial nozzle width of the first spiral channel or a corresponding partial nozzle which is formed by the partial nozzle width.

In another advantageous embodiment of the invention, the partial nozzle width of the first spiral channel increases in a transition area from a first angular range to the further angular range. Thus, starting from the first angular range in the peripheral direction of the turbine wheel, the partial nozzle width and thus the partial nozzle of the first spiral channel increase. A particularly flow-optimized transition is thus provided, which keeps flow losses low. This further contributes to efficient operation and high efficiency of the turbine according to the invention.

If the partial nozzle width of the first spiral channel in the transition area increases at least essentially to the overall nozzle width, this has the advantage that a particularly wide partial nozzle of the first spiral channel is provided, which in the further angular range represents the overall nozzle width and thus an overall nozzle of the turbine, via which exhaust gas may flow against the turbine wheel. This keeps the ventilation losses particularly low, which is accompanied by particularly high efficiency of the turbine according to the invention.

The turbine according to the invention is designed as a radial turbine, for example, in which [exhaust gas] flows against the turbine wheel at least essentially in the radial direction thereof via the partial nozzle or the overall nozzle situated upstream from the turbine wheel in the direction of flow of the exhaust gas through the turbine housing.

In another advantageous embodiment of the invention, a mass supply of exhaust gas to the turbine wheel is variably provided via the first and/or the second, in particular via the first, spiral channel, in the peripheral direction of the turbine wheel. In other words, a mass supply of exhaust gas to the turbine wheel, viewed over the periphery in the peripheral direction of the turbine wheel, is not constant. Thus, a mass supply which is nonuniform viewed over the periphery in the peripheral direction of the turbine wheel is counteracted by the segmentation, in which the mass supply to the turbine wheel is reduced via the first spiral channel in the first angular range, for example. The turbine according to the invention thus has particularly efficient operation and high efficiency. This nonuniform mass supply is achieved, for example, in that an A/R ratio associated with the second spiral channel is variable in the peripheral direction of the turbine wheel, where A denotes a spiral or center-of-mass surface area of the second spiral channel via which the turbine wheel may be acted on by exhaust gas, and R denotes a center-of-mass [radius] of the second spiral channel.

Additionally or alternatively, it may be provided that an A/R ratio associated with the first spiral channel is variable in the peripheral direction, where A denotes a spiral or center-of-mass surface area of the first spiral channel via which the turbine wheel is acted on by exhaust gas, and R denotes a center-of-mass radius of the first spiral channel. When the A/R ratio of the second spiral channel is reduced in particular close to the minimum of 0, the mass supply of the first spiral channel to the turbine wheel may be increased. This brings about a more uniform mass supply to the turbine wheel from the standpoint of an overall mass of the exhaust gas, resulting in a particularly homogeneous flow field and a particularly high efficiency, while at the same time maintaining simple, time- and cost-efficient manufacture of the turbine according to the invention. Thus, one possible aim of such a design could be a uniform inflow of the overall mass of exhaust gas in the peripheral direction of the turbine wheel over the periphery thereof, although this is not absolutely necessary.

The turbine according to the invention thus has a particularly simple design for a time- and cost-efficient manufacture, resulting in a particularly low level of variation in serial production, in particular with regard to flow properties of the turbine. The improved efficiency of the turbine results in increased efficiency of the associated internal combustion engine, which is accompanied by low fuel consumption as well as low $CO_2$ emissions of the internal combustion engine.

In another advantageous embodiment of the invention, the second spiral channel has a smaller flow cross section than the first spiral channel. The second spiral channel thus has a particularly good accumulation effect, so that particularly large quantities of exhaust gas may be recirculated in order to keep the nitrogen oxides and particulate emissions of the internal combustion engine low.

When the spiral channels are asymmetrical with respect to one another, in particular in relation to a respective flow cross section, this has the advantage that the accumulation characteristic of the turbine may be set in particular according to need in order to achieve high exhaust gas recirculation rates.

The invention will become more readily apparent from the following description of exemplary embodiments, with reference to the accompanying drawings. The features and feature combinations mentioned above in the description, as well as the features and feature combinations mentioned below in the description of the figures and/or shown in the figures alone, are usable not only in the particular stated combination, but also in other combinations or alone without departing from the scope of the invention.

BRIEF DESCRIPTION OF THE DRAWINGS

FIG. 2 shows a sectional schematic longitudinal view of the turbine according to FIG. 1b along a sectional line A-A in FIG. 1b;

FIG. 3 shows a sectional schematic longitudinal view of the turbine according to FIG. 1c along a sectional line B-B in FIG. 1c;

FIG. 4 shows a schematic cross-sectional view of the turbine according to FIG. 1c;

FIG. 5 shows four sectional schematic longitudinal views of the turbine according to FIG. 4 along a corresponding sectional planes;

DESCRIPTION OF AN EXEMPLARY EMBODIMENT

Figure 1A:
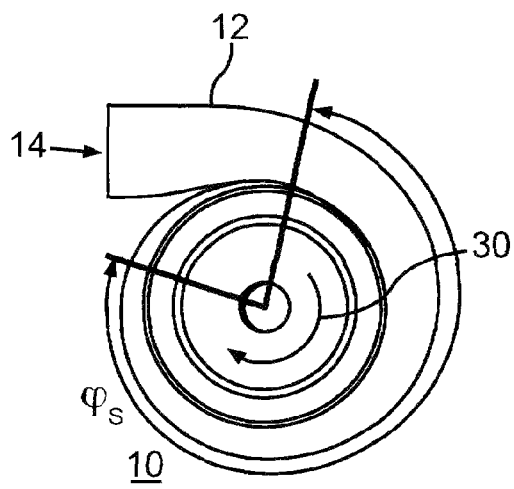
FIGS. 1a-1d each show a schematic side view of a turbine of an exhaust gas turbocharger, having a turbine housing which has two spiral channels that extend in different wrap angle ranges.

FIGS. 1a-1d each show a turbine 10 for an exhaust gas turbocharger of an internal combustion engine which includes a turbine housing 12 and at least one duct 14. As is apparent in particular from FIG. 2, which shows the turbine 10 according to FIG. 1b along, the sectional line A-A, the duct 14 is segmented, and divided into a first spiral channel 16 and a second spiral channel 18 by means of an intermediate wall 21 of the turbine housing 12. The intermediate wall 21 fluidly separates the first spiral channel 16 and the second spiral channel 18, at least in parts, and in particular in the axial direction of the turbine 10, which is indicated by a directional arrow 22.

A turbine wheel 24 which is rotatable about a rotational axis 26 is accommodated in the turbine housing 12, and may be acted on and thus driven by exhaust gas flowing through the duct 14. To this end, the exhaust gas flows through the duct 14 and thus through the spiral channels 16, 18. The exhaust gas flows from the first spiral channel 16 and the second spiral channel 18 into an overall nozzle 20 which has an overall nozzle width of $b_{HD}$. The overall nozzle 20 is also referred to as the main nozzle. With optimal inflow, the exhaust gas flows in the relative system from the overall nozzle 20 against the turbine wheel 24 at least essentially in the radial direction (directional arrow 28) and drives same.

The first spiral channel 16 is designed as a full spiral, for example, and extends in the peripheral direction (directional arrow 30) of the turbine wheel 24 over the periphery thereof over a wrap angle range $\phi_{GS}$ of greater than 350°, for example.

Figure 1B:
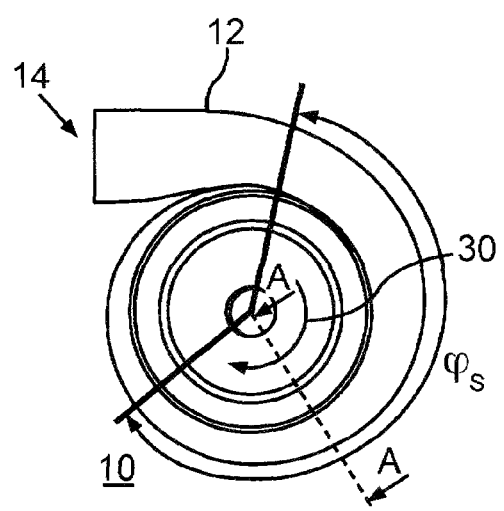
Figure 1C:
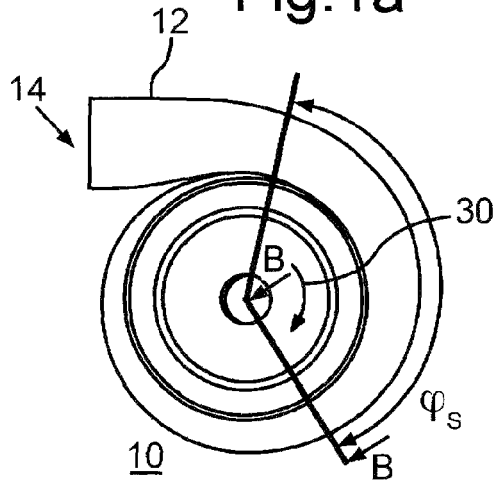
Figure 1D:
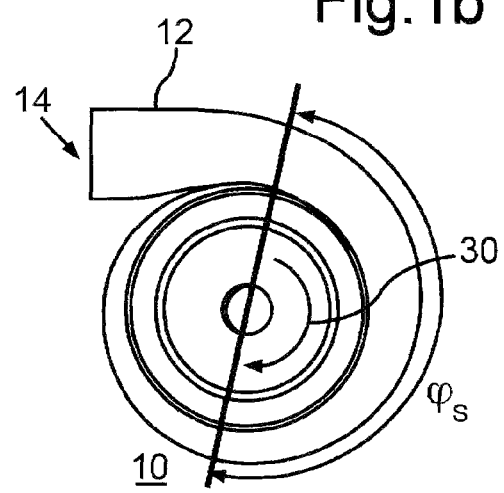

The second spiral channel 18 is designed as a partial spiral and extends, for example, in a wrap angle range $\phi_S$ of 280° according to FIG. 1a, of 220° according to FIG. 1b, of 140° according to FIG. 1c, or of 180° according to FIG. 1d. This means that the wrap angle range $\phi_S$ of the second spiral channel 18 is smaller than the wrap angle range $\phi_{GS}$ of the first spiral channel 16. As a result, the first spiral channel 16 and the second spiral channel 18 are situated adjacently, relative to the axial direction (directional arrow 22) of the turbine wheel 24, in at least one angular range. In other words, the first spiral channel 16, as well the second spiral channel 18, extend in this first angular range, relative to the axial direction of the turbine wheel 24. Therefore, in addition at least one further angular range of the wrap angle range of the first spiral channel 16 exists in which only the first spiral channel 16 extends, but in which the second spiral channel 18 does not, or no longer, extends. Thus, only the first spiral channel 16 having the larger wrap angle range $\phi_{GS}$ still extends in the further turbine area, relative to the axial direction of the turbine wheel 24.

An advantageous accumulation characteristic of the duct 14 is provided as a result of these different wrap angle ranges, so that particularly high exhaust gas recirculation rates are providable by means of the duct 14.

The first spiral channel 16 is used as a so-called λ channel, and serves the purpose of setting a force-to-air ratio of the internal combustion engine for providing desired power and torque. The second spiral channel 18 is referred to as a so-called EGR channel, and is used to provide a high accumulation effect, to recirculate a particularly large quantity of exhaust gas from an exhaust tract to an intake tract of the internal combustion engine, and to introduce the exhaust gas into the intake tract. Thus, air drawn in by the internal combustion engine may be acted on by exhaust gas, so that nitrogen oxides and particulate emissions may be kept low.

In the first angular range, the first spiral channel 16 has a first partial nozzle 32 with a partial nozzle width $b_\lambda$, while the second spiral channel 18 has a second partial nozzle 34 with a partial nozzle width $b_{EGR}$. The exhaust gas flowing through the respective spiral channels 16, 18 flows from these partial nozzles 32, 34 into the overall nozzle 20, from which the exhaust gas flows against the turbine wheel 24 and drives it.

Apparent from FIG. 2 is an inflow geometry of exhaust gas to the turbine wheel 20 when the first spiral channel 16 and the second spiral channel 18, which as such may also be referred to as ducts, have an A/R ratio of greater than 0. In the A/R ratio, A denotes a spiral surface area of the first spiral channel 16 or of the second spiral channel 18, and R denotes a corresponding spiral center-of-mass radius of the first spiral channel 16 or of the second spiral channel 18. The A/R ratio is a measure for the swirl of the exhaust gas flow. If one considers, for example, a certain spiral cross-sectional area A, it depends on which corresponding spiral center-of-mass radius R at which this spiral cross-sectional area A is located. A small A/R ratio results in high swirl effects, and vice versa.

FIG. 3 shows the turbine 10 according to FIG. 1c along the corresponding sectional line B-B. Apparent from FIG. 3 is an inflow geometry when one of the two spiral channels 16, 18, in this case the second spiral channel 18, has an A/R ratio of at least essentially 0, while the other of the spiral channels, in this case the first spiral channel 16, has an A/R ratio of at least essentially greater than 0.

FIG. 4 shows the turbine 10 according to FIG. 1c having sectional lines B-B, C-C, D-D, and E-E. FIG. 5 shows the corresponding sectional illustrations. With reference to the sectional illustrations in FIG. 5, a transition area of the turbine 10 is illustrated which extends in an angular range over the periphery of the turbine wheel 24 in the peripheral direction (directional arrow 30) thereof. In this transition area, the first partial nozzle 32, starting from its partial nozzle width $b_\lambda$, increasingly widens until ultimately it at least essentially corresponds to a width $b_{HD}$ of the overall nozzle 20, referred to as the main nozzle. The first partial nozzle 32, which now represents the overall nozzle 20, maintains its overall nozzle width $b_{HD}$ in the wrap angle range $\phi_{GS}$ of the first spiral channel 16 in the further peripheral direction. The turbine 10 thus has particularly low ventilation losses, accompanied by a particularly high efficiency of the turbine 10. This allows a particularly efficient operation of the internal combustion engine with low fuel consumption and low $CO_2$ emissions. In addition, the turbine 10 can be manufactured in a particularly time- and cost-efficient manner.

Figure 6:
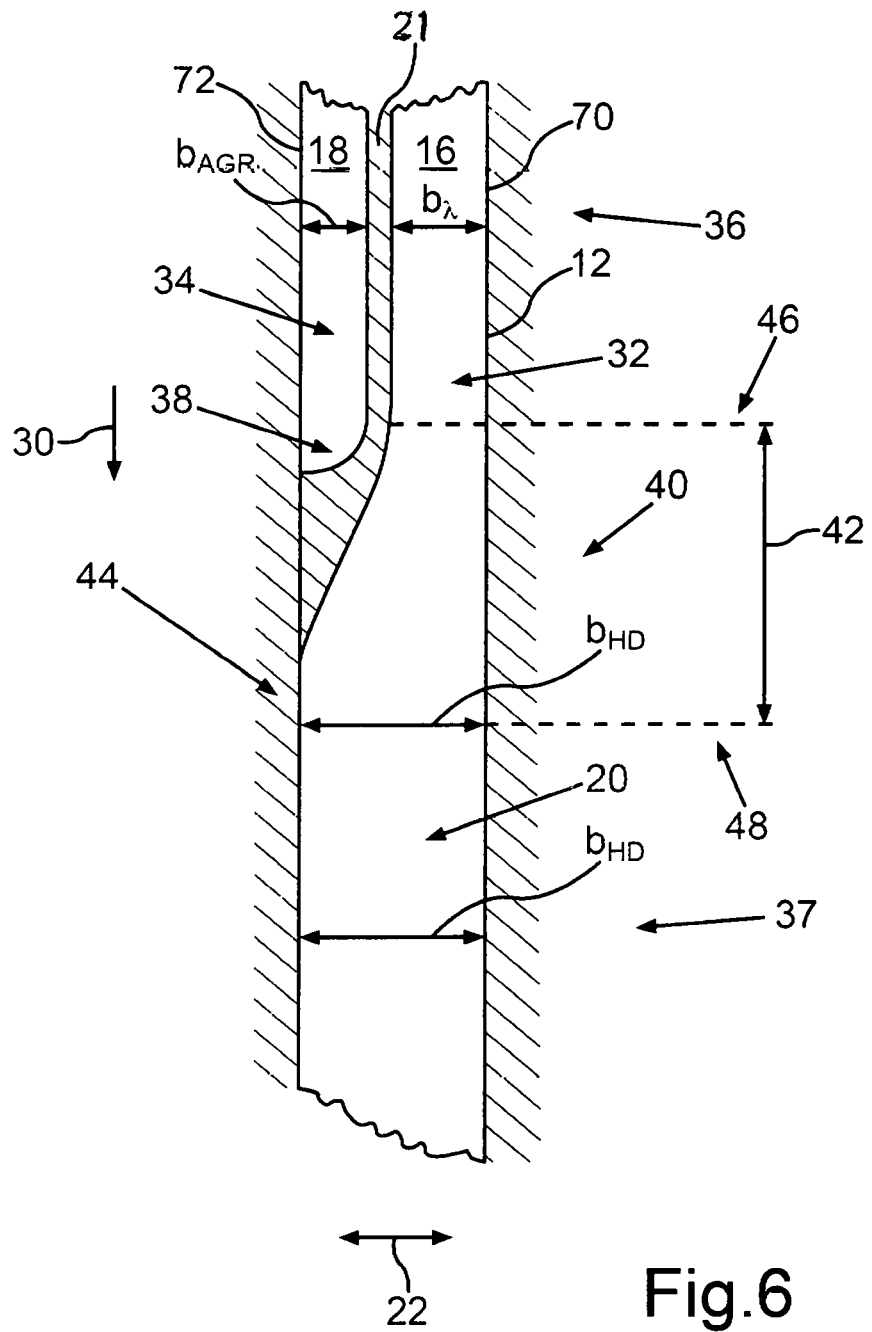
FIG. 6 shows a sectional schematic developed view of a nozzle of the turbine according to FIGS. 4 and 5.

This widening of the first partial nozzle 32 of the first spiral channel 16 is particularly apparent with reference to FIG. 6. The above-described first angular range is denoted by reference numeral 36 in FIG. 6. In the angular range 36, the first spiral channel 16 and the second spiral channel 18 are adjacently situated in the axial direction (directional arrow 22) of the turbine wheel 24. Viewed further in the peripheral direction (directional arrow 30) of the turbine wheel 24, starting from the angular range 36, the second spiral channel 18 ends in an area 38 since the second spiral channel has a smaller wrap angle range $\phi_S$ than the first spiral channel 16, whereby the first spiral channel 16 and the second spiral channel 18, starting from a turbine inlet of the turbine 10, for example, begin at the same level. For this reason, the first spiral channel 16 extends in the further angular range adjoining the first angular range 36 in the peripheral direction, which is denoted by reference numeral 37 in FIG. 6. In the described transition area, which is denoted by reference numeral 42 in FIG. 6, the partial nozzle width $b_\lambda$ of the first partial nozzle 32 of the first spiral channel 16 widens at least essentially continuously in the peripheral direction of the turbine wheel 24, so that at a location 44 of the wrap angle range of the first spiral channel 16, the partial nozzle width corresponds at least essentially to the overall nozzle width $b_{HD}$ of the overall nozzle 20, referred to as the main nozzle.

In other words, the overall nozzle 20 is then formed by the first partial nozzle 32, and vice versa. Since the second partial nozzle 34 of the second spiral channel 18 tapers to 0 in the area 38, which means that its flow cross section is reduced to 0, in the peripheral direction adjacent thereto the turbine wheel 24 is supplied with exhaust gas solely by the first spiral channel 16 via the first partial nozzle 32 thereof, which corresponds to the overall nozzle 20. A location 46 represents, for example, the start of the transition area 42, the sectional illustration B-B in FIG. 5 corresponding to the location 46. A location 48 represents, for example, an end of the transition area 42, which corresponds to the sectional illustration E-E in FIG. 5. The first partial nozzle 32 maintains its partial nozzle width $b_\lambda$, which corresponds to the overall nozzle width $b_{HD}$, in the peripheral direction adjacent to the location 48.

As is apparent from FIG. 6, in the angular range 36 the first partial nozzle 32 is delimited on the one hand by the intermediate wall 21 and on the other hand by a first wall 70 of the turbine housing 12. Similarly, in the axial direction (directional arrow 22) of the turbine wheel 24, the second partial nozzle 34 is delimited on the one hand by the intermediate wall 20 and on the other hand by a second wall 72 of the turbine housing 12. In the angular range 40, the overall nozzle 20 is delimited in the axial direction on the one hand by the first wall 70 and on the other hand by the second wall 72.

Figure 7:
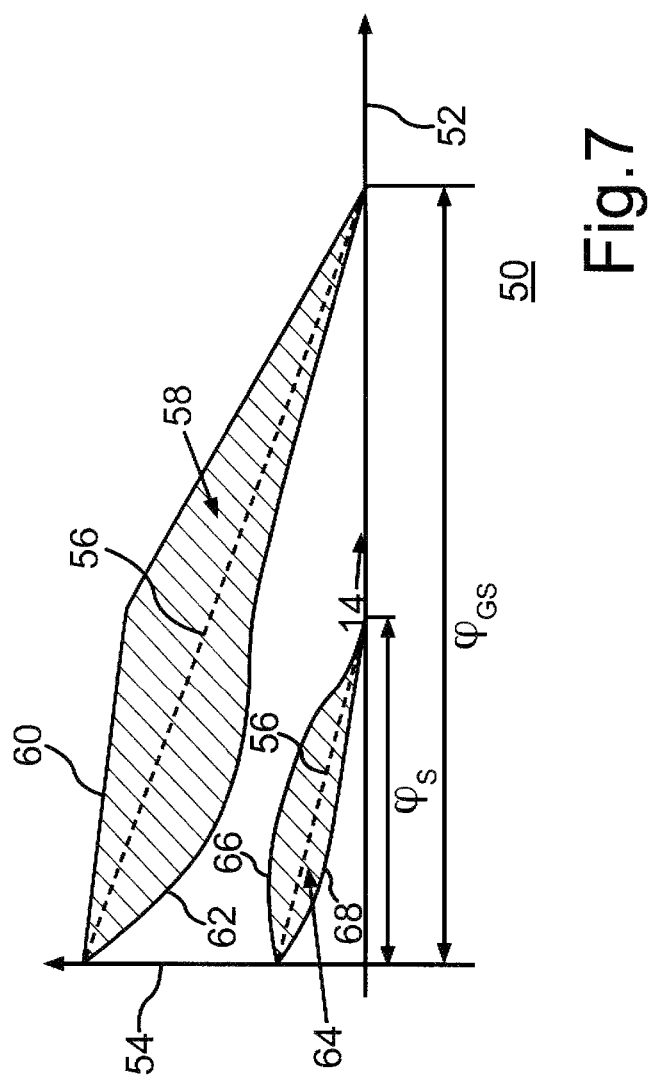
FIG. 7 shows two curves of a ratio of a spiral cross section and a spiral center-of-mass radius over a wrap angle range of spiral channels of the turbine according to FIGS. 4 and 5.

FIG. 7 shows a diagram 50 in which the wrap angle range of the first spiral channel 16, denoted by reference character $\phi_{GS}$, is plotted on the abscissa 52. The wrap angle range $\phi_{GS}$ is at least essentially 360°. The wrap angle range $\phi_S$ of the second spiral channel 18, which is at least essentially 140°, is likewise plotted on the abscissa 52. The diagram 52 includes an ordinate 54 on which the A/R ratio is plotted.

As is apparent from FIG. 7, the turbine 10 according to the preceding figures, in particular due to the widening first partial nozzle 32 of the first spiral channel 16, allows depiction of a curve of the A/R ratio of the first spiral channel 16 and/or of the second spiral channel 18, which in contrast to the linear curves illustrated by dashed lines 56 does not has to be linear, and advantageously is not linear. For the turbine 10 it is possible to depict a curve of the A/R ratio of the first spiral channel 16 which lies in a dashed-line area 56 of the diagram 50 which is enveloped by envelope lines 60 and 62.

With regard to the second spiral channel 18, it is possible to depict a curve of the A/R ratio of the second spiral channel 18 which lies in an area 64 that is enveloped by envelope lines 66 and 68. As a result, the turbine 10 has particularly good efficiency with particularly low efficiency losses. Due to this nonlinear setting and variation of the A/R ratio, a mass supply of exhaust gas of the turbine wheel 24 which is nonconstant viewed over the periphery of the turbine wheel 24 may be provided by the first spiral channel 16 and the second spiral channel 18. The nonuniform mass supply may thus be counteracted by the segmentation of the duct 14, which contributes to particularly high efficiency of the turbine 10.

What is claimed is:

1. A turbine (10) for an exhaust gas turbocharger comprising a turbine housing (12) with a first spiral channel (16) and a second spiral channel (18), the second spiral channel (18) extending over a wrap angle range ($\phi_S$) of less than 360 degrees in a peripheral direction (30) of a turbine wheel (24) of the turbine (10), and the first spiral channel (16) having a wrap angle range ($\phi_{GS}$) larger than the wrap angle range ($\phi_S$) of the second spiral channel (18), and the first spiral channel (16) and the second spiral channel (18) being arranged adjacent to each other in an axial direction (22) of the turbine wheel (24) in at least a first angular range (36) which includes the wrap angle ranges ($\phi_S$, $\phi_{GS}$), whereby exhaust gas flowing through the spiral channels (16, 18) impinges on a the turbine wheel (24) accommodated in the turbine housing (12) via a nozzle (20) which is delimited in the axial direction (22) by walls (70, 72) of the turbine housing (12) and which extends peripherally in a direction (30) around the turbine wheel (32) and has an overall nozzle width ($b_{HD}$), and to which exhaust gas is supplied, at least in the first angular range (36), over a respective partial nozzle width ($b_\lambda$, $b_{AGR}$) of the spiral channels (16, 18), the partial nozzle width ($b_\lambda$) of the first spiral channel (16) being greater than the partial nozzle width ($b_{80}$) of the first spiral channel (16) in the first angular range (36), at least in a further angular range (40, 42) of the wrap angle range ($\phi_{GS}$) which is different from the first angular range (36).

2. The turbine (10) according to claim 1, wherein the partial nozzle width ($b_\lambda$) of the first spiral channel (16) in the further angular range (40, 42) corresponds to the overall nozzle width ($b_{HD}$).

3. The turbine (10) according to claim 1, wherein the partial nozzle width ($b_\lambda$) of the first spiral channel (16) increases in a transition area (42) between the first angular range and the further angular range (36, 40).

4. The turbine (10) according to claim 3, wherein the partial nozzle width ($b_\lambda$) of the first spiral channel (16) in the transition area (42) increases to the overall nozzle width ($b_{HD}$).

5. The turbine (10) according to claim 1, wherein a mass supply of exhaust gas to the turbine wheel (24) is variably provided via at least one of the first and second spiral channels (16, 18) in the peripheral direction (30) of the turbine wheel (24).

6. The turbine (10) according to claim 1, wherein an A/R ratio associated with the second spiral channel (18) is variable in the peripheral direction (30) of the turbine wheel (24), where A denotes a spiral surface area of the second spiral channel (18) via which the turbine wheel (24) may be acted on by exhaust gas, and R denotes a center-of-mass radius of the second spiral channel (18).

7. The turbine (10) according to claim 1, wherein an A/R ratio associated with the first spiral channel (16) is variable in the peripheral direction (30) of the turbine wheel (24), where A denotes a spiral surface area of the first spiral channel (16) via which the turbine wheel (24) may be acted on by exhaust gas, and R denotes a center-of-mass radius of the first spiral channel (16).

8. The turbine (10) according to claim 1, wherein the second spiral channel (18) has a smaller flow cross section than the first spiral channel (16).

9. The turbine (10) according to claim 1, wherein the spiral channels (16, 18) are asymmetrical with respect to one another, in in relation to a respective flow cross section.

\* \* \* \* \*